United States Patent [19]

Greco et al.

[11] Patent Number: 5,246,685

[45] Date of Patent: Sep. 21, 1993

[54] GROUP VIB METAL CARBIDES FROM METAL SALICYLATE PRECURSORS

[75] Inventors: Carl C. Greco, Garnerville; Thomas A. Gallo, Thornwood; Fawzy G. Sherif, Stony Point, all of N.Y.

[73] Assignee: Akzo N.V., Arnhem, Netherlands

[21] Appl. No.: 934,041

[22] Filed: Aug. 21, 1992

[51] Int. Cl.$^5$ ............................................. C01B 31/34
[52] U.S. Cl. ..................................... 423/440; 423/439
[58] Field of Search .............. 423/439, 440, 441, 345; 501/87, 88; 427/249; 51/307

[56] References Cited

U.S. PATENT DOCUMENTS

| | | | |
|---|---|---|---|
| 4,784,688 | 11/1988 | Anderson | 423/53 |
| 4,826,666 | 5/1989 | Laine | 423/249 |
| 4,948,762 | 8/1990 | Krumbe et al. | 501/92 |
| 4,950,626 | 8/1990 | Birchall et al. | 501/88 |

FOREIGN PATENT DOCUMENTS 2634731  2/1977  Fed. Rep. of Germany .
49-43479 11/1974  Japan .
61-192345 8/1986  Japan .

OTHER PUBLICATIONS

Hattangadi, "How to Set a Periodic Table," *Industrial Chemist*, 9(5), May 1988, pp. 20–23.
V. H. Funk et al., Zeitschrift für Anorganische und Allgemeine Chemie, Band 315, 1962, pp. 204–212.
S. Prasad et al., Jour. Indian Chem. Soc., vol. 38, No. 3, 1961, pp. 153–154.

*Primary Examiner*—Michael Lewis
*Assistant Examiner*—Stephen G. Kalinchak
*Attorney, Agent, or Firm*—Richard P. Fennelly; Louis A. Morris

[57] ABSTRACT

Carbides of Group VIB metals, such as tungsten and molybdenum, can be formed by the pyrolysis of a salicylate of such metal. The salicylate can be formed by reaction of a Group VIB metal halide with salicylic acid.

9 Claims, No Drawings

GROUP VIB METAL CARBIDES FROM METAL SALICYLATE PRECURSORS

BACKGROUND OF THE INVENTION

Persons of ordinary skill in the art know how to form a variety of metal carbides, including those of the Group VIB metals (e.g., tungsten and molybdenum), by the pyrolysis of precursor compositions which can be obtained in a variety of ways.

U.S. Pat. No. 4,826,666 to R. M. Laine teaches the preparation of organometallic complexes of various metals as precursors.

Krumbe and co-workers react metal containing compounds (for example, metal halides or metalloid halides) with a carbon-hydroxy functional polymerizable compound (e.g., phenol with formaldehyde or furfuryl alcohol) to yield a composition which can be pyrolyzed (U.S. Pat. No. 4,948,762).

U.S. Pat. No. 4,950,626 to J. D. Birchall et al. reacts a compound of a metallic or non-metallic element having at least two groups reactive with hydroxyl groups and an organic compound having at least two hydroxyl groups to produce an oxygen-containing polymeric product which can be pyrolyzed to form a carbide.

Japanese Patent Publication No. 43479/74 discusses production of tungsten carbide powder by dispersing tungstic acid containing ammonium chloride or nitrate into an alcohol to form a slurry, heating the slurry to form a soluble tungstic ester which ultimately can be carbonized to form the carbide.

Japanese Patent Publication No. 61/192,345 speaks of forming catalytic carbides by carbonizing polyacids of tungsten and/or molybdenum with a carbonizing agent such as carbon monoxide or methane.

While certain disclosures exist in the prior art in regard to the reaction of tungsten with a hydroxy acid such as salicylic acid (see Journal of the Indian Chemical Society, Vol. 38, No. 3, 1961, pp. 153-154 and Zeitschrift fur anorganische und allgemeine Chemie, Band 315, pp. 211-212), such disclosures contain no suggestion that the resulting materials can be pyrolyzed to form a carbide, particularly one which possesses catalytic properties.

DESCRIPTION OF THE INVENTION

The present invention relates to the formation of a carbide of a Group VIB metal which comprises the pyrolysis of a salicylate of such a metal.

The Group VIB metals contemplated, as preferred embodiments for the present invention, include tungsten and molybdenum. These metals are present in a compound which can be reacted with a salicylic acid reagent to form the desired metal salicylate precursor which can then be calcined to form a carbide. Group VIB metal halides, such as the chlorides, are a preferred Group VIB metal reagent to employ.

The salicylic acid reagent which is preferred for use is salicylic acid itself.

The reaction of Group VIB metal compound and salicylic acid can be conducted in a suitable organic solvent, such as an aromatic solvent (e.g., xylene) to form the metal salicylate, e.g. a trisalicyloxide of the metal. If water is present as well, the reaction produces oxydisalicyloxides of the selected metal. In selecting appropriate amounts of either to react the equivalent amounts of halogen, for example, in the metal compound are balanced with the equivalents of hydroxy groups from the acid or acid plus water in the system.

The resulting metal salicylates can be pyrolyzed to form the desired Group VIB carbides which have been found to be catalytic generally speaking, the pyrolysis temperatures will range from about 1000° C. to about 1400° C., depending on the precise type of salicylate formed.

The present invention is further understood by examination of the Examples which follow.

EXAMPLE 1

In a 500 cc flask was dissolved 15 g. of tungsten hexachloride (0.038 m) in 100 cc of tetrahydrofuran at room temperature. To this was added,drop wise, over a five minute period 0.68 g of water (0.038 m). The reaction was heated to reflux and distilled to remove a hydrochloric acid-tetrahydrofuran azeotrope. The tetrahydrofuran was replaced with an equal amount of mesitylene. After substantially all the hydrochloric acid was removed, the reaction was cooled to room temperature and 9.3 g of salicylic acid (0.076 m) dissolved in 300 cc of mesitylene was added. The reaction was equipped with a gas inlet tube under the surface of the resulting sol. The reaction mixture was then heated to reflux with a sparge of nitrogen gas passing through the solution via the gas inlet tube. After substantially all the hydrochloric acid was removed by the nitrogen purge at reflux, which took three to four hours, the reaction was allowed to cool and was then stripped on the flash evaporator to constant weight. A viscous semi-solid remained in near quantitative yield. The semi-solid was made crystalline by washing with cold ether. A black-green solid was collected as the product (13.2 g, 80% yield), ditungsten dioxy tetrasalicyloxide.

EXAMPLE 2

The trisalicyloxide of tungsten was prepared by placing 20 g of tungsten (VI) chloride (0.05 mole) in a reactor vessel with 650 cc of low boiling naphtha (b.p. of 162°-180° C.) under dry nitrogen. To this was added 22 g (0.16 mole) of salicylic acid, and the reaction mixture was stirred and heated to reflux. Reaction was evident by the evolution of hydrogen chloride gas which was removed by nitrogen purge. The oil bath temperature was raised to heat the reaction mixture to the vicinity of 162° C. and was maintained at this temperature for eight hours. At this point, the evolution of hydrogen chloride slowed and some of the solvent was distilled away.

The oil bath temperature was raised to 180° C., and the reaction continued until the evolution of hydrochloric acid ceased.

The reaction products in the vessel were placed under vacuum (20-30 mm pressure) and a pot temperature of 80° C. to remove the solvent. The cooled reaction mass, still kept under dry nitrogen, solidified upon standing. A red solid remained as the desired product in 97% yield (28 grams).

The isolated product can be used as a precursor for the preparation of tungsten carbide.

EXAMPLES 3-13

A series of precursor to tungsten carbide were synthesized and pyrolyzed as described below.

In the Table set forth below the following precursors were used:

Precursor

A: tungsten trisalicyloxide - $W(OC_6H_4COO)_3$
B: tungsten oxydisalicyloxide - $WO(OC_6H_4COO)_2$ The gas flow during the calcination (reduction) was at 1.0 liter/minute of argon containing 4 volume % hydrogen, unless otherwise noted, and the temperature was raised during heating at the rate of 20° C. per minute unless otherwise noted.

The post-reduction morphology, XRD data, and % Wt Gain (or loss in some cases) is given. The theoretical weight gain for conversion to tungsten carbide (WC) is 18.37%.

| Example No. | Precursor | Reduction Temp. (°C.) | Morphology | XRD | % Wt Gain |
|---|---|---|---|---|---|
| 3 | A | 600 | Black, chunky | Amorphous | −20.27* |
| 4 | A | 800 | Brown, black, chunky | $WO_3$ | −16.18* |
| 5 | A | 1000 | Foamed, black crystals | $W_2C$, other minor | — |
| 6 | A | 1000 | — | $W_2C$, W, WC | 4.22 |
| 7 | A | 1000 | Foamed, black crystals | $W_2C$, other minor | −14.80* |
| 8 | A | 1000 | Black | WC, W (minor) | 15.94 |
| 9 | A | 1200 | Grey/black | W, $W_2C$ (minor) | 14.71 |
| 10 | A | 1200[1] | Foamed, black crystals | $W_6C_{2.5}$, WC (minor) | −17.59* |
| 11 | A | 1350 | Foamed, black crystals | $W_6C_{2.5}$, WC (minor) | −13.33* |
| 12 | B | 1000 | Black powder | WC, $W_6C_{2.54}$ (minor) | 3.26* |
| 13 | B | 1000 | Grey foam crystals | $W_2C$ major, WC | −5.59 |

[1] a slow firing protocol used in which the rate of heating increase was 5° C. per minute.
*these samples represent the more preferred results. It was found that the presence of some excess carbon in these compositions was not detrimental.

EXAMPLES 14-15

These Examples show the results of using the tungsten salicylate-derived tungsten carbide materials formed from Examples 5 (Run A) and 7 (Run B), above, in converting n-heptane to low hydrocarbons ($C_1$ to $C_5$), isomers ($C_5$ and $C_6$) and aromatics. The experimental procedure was as follows: Catalytic carbide (0.5 g) was placed in a tubular microreactor and activated with a hydrogen gas stream at 550° C. for sixteen hours. The catalyst was then cooled to 350° C. and a gas stream of hydrogen saturated with n-heptane from a reservoir was passed over the catalyst at a rate of 10 cc/minute. The products were analyzed by an on-line gas chromatograph. The catalyst temperature was raised 50° C., left to equilibrate at that temperature for one hour, and then tested at 400° C. This process was repeated for tests at 450° C. and 500° C.

The results obtained were:

| | % Conversion To Hydrocarbons | |
|---|---|---|
| Temp. (°C.) | A | B |
| 350 | 8.3 | — |
| 400 | 27.2 | 30.4 |
| 450 | 38.5 | 50.2 |
| 500 | 87.0 | 61.8 |

EXAMPLES 16-17

The data shown below illustrate selectively data (rather than conversion data as shown in Examples 14–15) of the tungsten carbide-derived precursors (from Examples 5 and 7, respectively) used in Examples 14–15 (Runs A and B therein, respectively) in the type of n-heptane reforming reaction previously described in Examples 14–15:

| Temp. (°C.) | % $C_1$-$C_6$ (Run A) | % Isomers (Run A) | % Aromatics (Run A) |
|---|---|---|---|
| (Example 5) | | | |
| 350 | 4.7 | 92.5 | 0.1 |
| 400 | 12.0 | 83.1 | 1.4 |
| 450 | 26.5 | 51.2 | 12.1 |
| 500 | 51.4 | 3.5 | 40.3 |
| (Example 7) | | | |
| 350 | 14.2 | 83.6 | 1.5 |
| 400 | 28.5 | 53.3 | 15.7 |
| 450 | 33.9 | 23.0 | 39.4 |

The foregoing Examples are intended to illustrate certain preferred embodiments for the present invention and, for that reason, should not be construed in a limiting sense. The scope of protection sought is set forth in the claims which follow.

We claim:

1. A process for forming a carbide of a metal selected from the group consisting of chromium, molybdenum, and tungsten which comprises the pyrolysis of a salicylate of such a metal.

2. A process as claimed in claim 1 wherein the metal is tungsten.

3. A process as claimed in claim 1 wherein the metal is molybdenum.

4. A process as claimed in claim 1 wherein the salicylate is a trisalicyloxide of the metal.

5. A process as claimed in claim 4 wherein the metal is tungsten.

6. A process as claimed in claim 4 wherein the metal is molybdenum.

7. A process as claimed in claim 1 wherein the salicylate is an oxydisalicyloxide of the metal.

8. A process as claimed in claim 7 wherein the metal is tungsten.

9. A process as claimed in claim 7 wherein the metal is molybdenum.

* * * * *